(12) United States Patent
Lu et al.

(10) Patent No.: US 7,842,395 B2
(45) Date of Patent: Nov. 30, 2010

(54) MULTIPLE LAYER INTERLAYERS HAVING A GRADIENT REGION

(75) Inventors: Jun Lu, East Longmeadow, MA (US);
Marcin Wardak, Agawam, MA (US);
Andrew Neil Smith, East Longmeadow, MA (US); Gary Matis, Wilbraham, MA (US); Aristotelis Karagiannis, Amherst, MA (US); John Joseph D'Errico, Glastonbury, CT (US); David Paul Bourcier, Ludlow, MA (US)

(73) Assignee: Solutia Inc., St. Louis, MO (US)

( * ) Notice: Subject to any disclaimer, the term of this patent is extended or adjusted under 35 U.S.C. 154(b) by 758 days.

(21) Appl. No.: 11/555,678

(22) Filed: Nov. 1, 2006

(65) Prior Publication Data
US 2008/0102280 A1    May 1, 2008

(51) Int. Cl.
*B32B 27/08* (2006.01)
*B32B 27/22* (2006.01)
*B32B 27/38* (2006.01)

(52) U.S. Cl. .................. 428/525; 264/173.16; 428/436; 428/437

(58) Field of Classification Search ................ 428/436, 428/437, 525; 264/173.16
See application file for complete search history.

(56) References Cited

U.S. PATENT DOCUMENTS

| | | | |
|---|---|---|---|
| 3,884,865 A * | 5/1975 | Fariss et al. ................. | 524/314 |
| 4,276,351 A * | 6/1981 | Phillips ...................... | 428/437 |
| 4,316,868 A | 2/1982 | Esposito | |
| 4,555,434 A | 11/1985 | Kunert | |
| 4,937,147 A | 6/1990 | Cartier | |
| 4,948,672 A | 8/1990 | Cartier | |
| 4,952,457 A * | 8/1990 | Cartier et al. ............ | 428/425.6 |
| 5,087,502 A | 2/1992 | Esposito | |
| 5,130,174 A | 7/1992 | Esposito | |
| 5,154,870 A | 10/1992 | Urui | |
| 5,188,692 A | 2/1993 | Horvath | |
| 5,189,551 A | 2/1993 | Woodard | |
| 5,190,826 A | 3/1993 | Asahina | |
| 5,234,748 A | 8/1993 | Demiryont | |
| 5,250,146 A | 10/1993 | Horvath | |
| 5,340,654 A | 8/1994 | Ueda | |
| 5,425,977 A | 6/1995 | Hopfe | |
| 5,455,103 A | 10/1995 | Hoagland | |
| 5,482,767 A | 1/1996 | Karagiannis | |
| 5,487,939 A | 1/1996 | Phillips | |
| 5,556,505 A | 9/1996 | Hill | |

(Continued)

FOREIGN PATENT DOCUMENTS

EP    0631861    1/1995

(Continued)

*Primary Examiner*—D. S Nakarani
(74) *Attorney, Agent, or Firm*—Lewis, Rice & Fingersh, L.C.

(57) ABSTRACT

The present invention provides multiple layer interlayers that can be used in multiple layer glass panel type applications to reduce the amount of sound transmitted through the panel while also providing a colored region within a gradient region. The acoustic effect can be achieved by using two or more polymer sheets having differing compositions that have been combined into a single multiple layer interlayer, and the gradient region effect is achieved by forming a colored region in one or more gradient regions of the individual layers.

24 Claims, 1 Drawing Sheet

U.S. PATENT DOCUMENTS

| | | | |
|---|---|---|---|
| 5,578,153 A | 11/1996 | Hill | |
| 5,631,315 A * | 5/1997 | D'Errico | 524/314 |
| 5,792,559 A * | 8/1998 | Heithoff et al. | 428/437 |
| 6,093,471 A | 7/2000 | Hopfe | |
| 6,620,477 B2 * | 9/2003 | Nagai | 428/46 |
| 6,797,396 B1 | 9/2004 | Liu | |
| 6,927,900 B2 | 8/2005 | Liu | |
| 2004/0004778 A1 | 1/2004 | Liu | |
| 2005/0166639 A1 | 8/2005 | Skeen | |
| 2005/0170160 A1 * | 8/2005 | Moran et al. | 428/214 |
| 2005/0207002 A1 | 9/2005 | Liu | |
| 2006/0063007 A1 | 3/2006 | Anderson | |
| 2006/0210782 A1 | 9/2006 | Lu | |

FOREIGN PATENT DOCUMENTS

| | | |
|---|---|---|
| EP | 0710545 | 5/1996 |
| EP | 1281690 | 5/2003 |
| GB | 1470844 | 4/1977 |
| JP | 2229742 | 9/1990 |
| JP | 3204890 | 9/1991 |
| JP | 4317443 | 11/1992 |
| JP | 5138840 | 6/1993 |
| JP | 5310449 | 11/1993 |
| JP | 7097240 | 4/1995 |
| JP | 7172879 | 7/1995 |
| JP | 07206483 | 8/1995 |
| JP | 10036146 | 2/1998 |
| JP | 11255827 | 9/1999 |
| JP | 191348 | 7/2000 |
| JP | 200272936 | 10/2000 |
| JP | 200272937 | 10/2000 |
| JP | 2000319044 | 11/2000 |
| JP | 2000326445 | 11/2000 |
| JP | 200148601 | 2/2001 |
| JP | 2001106554 | 4/2001 |
| JP | 2001106556 | 4/2001 |
| JP | 2001192243 | 7/2001 |
| JP | 2001206742 | 7/2001 |
| JP | 2001206743 | 7/2001 |
| JP | 2001220183 | 8/2001 |
| JP | 2001220184 | 8/2001 |
| JP | 2001226152 | 8/2001 |
| JP | 2005-289038 * | 10/2005 |

* cited by examiner

MULTIPLE LAYER INTERLAYERS HAVING A GRADIENT REGION

FIELD OF THE INVENTION

The present invention is in the field of polymer interlayers and glass panels comprising polymer interlayers, and, more specifically, the present invention is in the field of polymer interlayers comprising multiple thermoplastic sheets.

BACKGROUND

Poly(vinyl butyral) (PVB) is commonly used in the manufacture of polymer sheets that can be used as interlayers in light-transmitting laminates such as safety glass or polymeric laminates. Safety glass often refers to a transparent laminate comprising a poly(vinyl butyral) sheet disposed between two sheets of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

An important consideration for the formulation of the thermoplastic interlayer is the sound transmission character of the finished product. Generally it is desirable to use interlayers that reduce the level of outside noise that is transmitted through the glass. A conventional single polymer sheet interlayer that has been modified to improve sound performance will usually have one or more physical characteristics modified in order to reduce the percentage transmission of sound through the glass. Conventional attempts at such acoustic dampening have included using thermoplastic polymers with low glass transition temperatures. Single sheet interlayers that have been formulated to improve sound transmission characteristics, however, are typically difficult to handle and are limited in the compositional variations that can be pragmatically employed.

Recent attempts to improve sound transmission characteristics while also maintaining manageability of the interlayer have involved using multiple polymer sheet layers in place of the conventional single polymer sheet interlayer. For example, two adjacent layers of thermoplastic polymer have been employed where the layers have dissimilar characteristics (see, for example U.S. Pat. Nos. 5,340,654 and 5,190,826, and U.S. Patent Application 2003/0139520 A1).

Unfortunately, the advent of multiple layer interlayers has resulted in the reemergence of challenges that had been overcome for single layer interlayers. For example, while incorporation of a colored gradient into a thicker, single polymer sheet interlayer has been known for some time (see, for example, U.S. Pat. Nos. 4,316,868 and 3,799,718), the incorporation of a colored gradient into a multiple layer interlayer having two or more thinner polymer sheets presents processing difficulties that can result in substandard appearance, stability, and/or glass adhesion in finished laminated glass products.

Further improved compositions and methods are needed to enhance the sound dampening characteristics of multiple layer glass panels, and specifically multiple layer glass panels comprising poly(vinyl butyral) layers, while allowing facile processing and without negatively impacting optical qualities.

SUMMARY OF THE INVENTION

The present invention provides multiple layer interlayers that can be used in multiple layer glass panel type applications to reduce the amount of sound transmitted through the panel while also providing a colored region within a gradient region. The acoustic effect can be achieved by using two or more polymer sheets having differing compositions that have been combined into a single multiple layer interlayer, and the gradient region effect is achieved by forming a colored region in one or more gradient regions of the individual layers.

DETAILED DESCRIPTION

Figure 1:
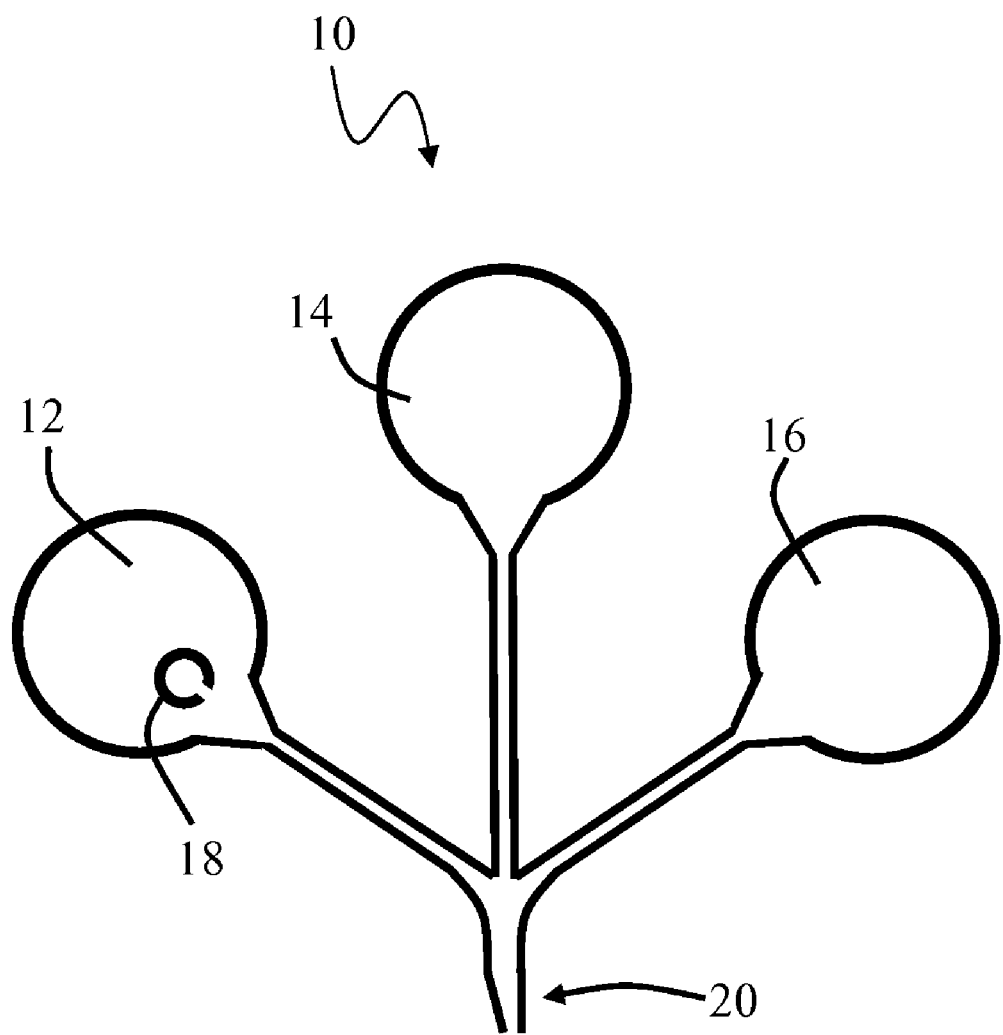
FIG. 1 represents a schematic cross sectional view of a multiple manifold coextrusion device of the present invention.

According to the present invention, it has now been surprisingly discovered that a colored region can be incorporated into a gradient region of a multiple layer acoustic-type interlayer using, for example, a multiple manifold coextrusion device.

As used herein, a "gradient region" is the portion of a polymer sheet that corresponds with the top portion of a windshield in a finished product in which gradients are conventionally formed. Gradient regions of the present invention can have any suitable height that does not obscure a driver's view. A gradient region can extend to the very top edge of an interlayer or it can be a stripe that is located at the top of the interlayer that leaves a small region above the gradient region that is not part of the gradient region. In various embodiments, a "gradient region" refers to the top portion of a polymer sheet as it is installed in a finished vehicle windshield, as viewed from the interior of the vehicle. In various embodiments, the gradient region of the interlayer corresponds to the top 8 centimeters to 26 centimeters of the finished windshield. The gradient region has conventionally been used to provide a shaded gradient that blocks a portion of the solar radiation impinging upon that portion of the windshield.

As used herein, each polymer sheet within an interlayer has a gradient region, although the region may be devoid of coloration, thereby rendering the gradient region indistinct from the remainder of the polymer sheet, which is known as the "clear" region.

Interlayers of the present invention include at least one colored region within a gradient region of a polymer sheet. As used herein, a "colored region" is a portion of the gradient region that has a pigment, dye, or other colorant that results in a color or appearance that is distinct from the remainder of the polymer sheet. In various embodiments, a pigment is used to impart color to the colored region.

In various embodiments, a colored region can be formed in a gradient region so that the color has consistent composition and optical character throughout the gradient region. In other embodiments, coloration will change in a uniform or non-uniform manner to produce a gradient with the desired visual effect. For example, a gradient could range from clear to opaque in a linear, exponential, or discrete step change function, with, for example, optical density values ranging from zero to four within the gradient region. Patterns and images can also be formed within the colored region. In further embodiments, a colored region can be formed in a defined subregion of the gradient region. For example, a colored region can be formed in a centered subregion of the gradient region that has the same height as the gradient region but only half the width, which results in a rectangular subregion of the gradient region having a coloration. Many other shapes and distributions of coloration within a subregion are possible and within the scope of the present invention. Black, white, and gray, as well as all other colors, are included within the scope of a colored region.

A colored region can be formed in any suitable manner, and, in a preferred embodiment, the colored region is formed in a polymer layer during extrusion using coextrusion or extrusion coating techniques, for example. In coextruded embodiments, for example, a polymer melt comprising the polymer resin, plasticizer, added agents, and the coloring agent are mixed and coextruded with a conventional polymer melt, resulting in a single polymer sheet having a gradient region formed therein in which coloring agents are dispersed through the gradient region.

Colored regions can be formed in gradient regions of one or more polymer sheets in an interlayer. For interlayers in which more than one polymer sheet has a colored region, the multiple colored regions can be colored the same or different. If different patterns or colors are used, combinative effects can be created that would be more difficult or impossible to achieve with a colored region in a single layer. In multiple colored region embodiments, colored regions can be the same shape and size, or they can be different. For example, a first colored region can be formed in a first polymer sheet that occupies the entire gradient region, and a second colored region can be formed that occupies a subregion of the gradient region in a second polymer sheet.

The adhesion of multiple layer interlayers to glass is controlled through the use of adhesion control agents. Adhesion control agents, for example, can be in the form of sodium salts, potassium salts, or magnesium salts of carboxylic acids. It is preferred that the adhesion level in gradient regions having a colored region is at the same level as the adhesion level in the adjacent clear region, which is properly controlled to meet impact criteria described in various government standards (for examples, ANSI Z26.01 Item 1 and EC R43). Lower adhesion in the gradient region can potentially cause the glass to de-bound or delaminate from the interlayer in the event of an impact, resulting in shards of glass or flying glass, thereby defeating the safety features of laminated glass.

For the purpose of the present invention, the adhesion of interlayer to, for example, glass, can be measured by pummel adhesion, as described below. An adhesion difference, or adhesion delta, between a clear region and a gradient region is preferably less than 1 pummel unit.

In various embodiments of the present invention, a gradient region having a colored region has an adhesion control agent concentration that is lower than the adhesion control agent concentration in the remainder of the polymer sheet. In various embodiments, the total alkaline titer of the gradient region is at least 4 less than the total alkaline titer of the clear region of the polymer sheet. This difference can be easily achieved, for example, by altering the salt concentrations in one or more of the melts used to form the clear and gradient regions during coextrusion. By altering the relative concentrations of the adhesion control agents in the gradient region, the adhesion of the gradient region to, for example, glass, can be increased.

In various embodiments of the present invention, the adhesion of a gradient region comprising a colored region is improved through the incorporation of an epoxy resin in the melt used to form the gradient region. Any suitable epoxy resin can be used, and, in preferred embodiments, an epoxy composition is selected from (a) epoxy resins comprising monomeric diglycidyl ether of bisphenol-A; (b) epoxy resins comprising monomeric diglycidyl ether of bisphenol-F; (c) epoxy resins comprising hydrogenated diglycidyl ether of bisphenol-A; (d) polyepoxidized phenol novolacs; (e) diepoxides of polyglycols, alternatively known as an epoxy terminated polyether; (f) glycidyl alkyl ether; and (g) a mixture of any of the foregoing epoxy resins of (a) through (f). Further information on these classes is in the Encyclopedia of Polymer Science and Technology, Volume 6, 1967, Interscience Publishers, N.Y., pages 209-271. Epoxy resin can be incorporated in concentrations of 0.5 to 10 parts per hundred relative to the main resin used (for example, poly(vinyl butyral)) in the colored region or 1 to 5 parts per hundred relative to the main resin used in the colored region.

A suitable commercially available diglycidyl ether of bisphenol-A of class (a) is DER 331 from Dow Chemical Company. A diglycidyl ether of bisphenol-F epoxy of class (b) is EPON Resin DPL-862 and a hydrogenated diglycidyl ether of bisphenol-A epoxy of class (c) is EPONEX Resin 1510, both of the latter available from Shell Chemical Company. A polyepoxidized phenol formaldehyde novolac of class (d) is available from Dow Chemical as DEN 431. A diepoxide of poly(oxypropylene) glycol of class (e) is available from Dow Chemical as DER 732. A glycidyl alkyl ether of class (f) is available from Hexion as Heloxy Modifier 116.

In various embodiments of the present invention, the gradient region is extended to a greater proportion of the interlayer. In conventional applications, for example, the ratio of the height of the gradient region to the height of the clear region below it, the "gradient to clear ratio", is 0.1-0.25. In embodiments of the present invention in which the gradient region is increased, the gradient to clear ratio is greater than 0.25, greater than 0.3, or greater than 0.4. These embodiments are particularly useful to applications that integrate the windshield and a sunroof with a single laminated glass panel. In these embodiments, the gradient region extends from the usual starting point at the top of the forward viewing area to the sun roof area. Other applications for this type of gradient region are also within the scope of the present invention.

Multiple layer interlayers of the present invention are preferably formed using a multiple manifold coextrusion device such as the one shown in FIG. 1. As shown in schematic cross sectional view generally at 10, an extrusion device has a first die manifold 12 a second die manifold 14, and a third die manifold 16. A probe 18 is disposed within the first die manifold. The probe 18 has an orifice that has a width that is approximately the width of the desired finished colored region.

The device shown in FIG. 1 operates by simultaneously extruding polymer melts from each manifold (12, 14, 16) toward the extrusion opening 20, where the multiple layer interlayer is extruded as a composite of three individual layers. Sheet thickness can be varied by adjusting the distance between the die lips at the extrusion opening 20. A probe can also be added to the second manifold 14 and/or the third manifold 16—either in addition to or in place of the first probe 18—in order to vary the location of one or more colored regions within the finished interlayer.

In other embodiments, an extrusion device can have 2, 3, or more die manifolds, each of which can be supplied with a separate polymer melt. Probes can be inserted into one or more of the manifolds in order to form colored regions in one or more of the coextruded melts.

Multiple layer interlayers of the present invention that function to reduce sound transmission through a glass panel include those known in the art, for example, and not limited to those disclosed in U.S. Pat. No. 5,190,826, which teaches the use of acetals of differing carbon length, Japanese Patent Application 3124441A and U.S. Patent Application 2003/0139520 A1, which teach the use of differing polymerization degree, and Japanese Patent 3,377,848 and U.S. Pat. No. 5,340,654, which teach the use of residual acetate levels of at least 5 mole % in one of two adjacent sheets as a compositional difference.

In a preferred embodiment, superior sound suppression characteristics can be imparted on multiple layer glass panels by incorporating a multiple layer interlayer into the panels, where the interlayer comprises two polymer sheets having different plasticizer concentrations. By formulating polymer sheets to stably contain differing plasticizer concentrations, as described in detail herein throughout, it has been found that sound transmission through multiple layer glass panels can be reduced by, for example, more than 2 decibels in the frequency or frequency region of interest. Further, because embodiments having three polymer sheet layers can be formulated to be easily handled and used as a direct replacement for conventional interlayers in conventional processes, interlayers of the present invention will be usable in many applications without requiring any modification to the manufacturing method used in the applications. For example, automotive windshield applications can involve the use of a conventional polymeric interlayer that can be replaced with an interlayer of the present invention without altering the lamination process used to form the finished windshield.

As used herein, an "interlayer" is any thermoplastic construct that can be used in multiple layer glass applications, such as safety glass in windshields and architectural windows, and a "multiple layer" interlayer is any interlayer that is formed by combining, through laminating processes or through coextrusion processes, two or more individual layers into a single interlayer.

In various embodiments of the present invention, a multiple layer interlayer comprises two polymer sheets disposed in contact with each other, wherein each polymer sheet comprises a thermoplastic polymer, as detailed elsewhere herein, and wherein at least one of the polymer sheets has a gradient region having a colored region. The thermoplastic polymer can be the same or different in each sheet. In these embodiments, a sound dampening effect is imparted to the interlayer by fabricating each polymer sheet with a different plasticizer content, and then laminating the two layers together to form a single, multiple layer interlayer. The composition of the polymer sheets is such that net migration of plasticizer from one polymer sheet to another is negligible or zero, thereby maintaining the plasticizer differential.

In various embodiments of the present invention, the colored region in the gradient region of the multiple layer interlayer can be stably formulated to have the same plasticizer concentration as the plasticizer concentration in one of the polymer sheets in a multiple layer interlayer, including the clear region in the polymer sheet in which the colored region is formed.

In various embodiments of the present invention, the colored region in the gradient region of the multiple layer interlayer can be stably formulated to have a plasticizer concentration that is different from any of the plasticizer concentrations of the polymer sheets of a multiple layer interlayer, including the clear region in the polymer sheet in which the colored region is formed.

In various embodiments of the present invention, a polymer sheet can be stably formulated to have the same plasticizer concentration in each sheet, while the colored region in a gradient region of the multiple layer interlayer is stably formulated to have a plasticizer concentration that is different from the plasticizer concentrations of the polymer sheets, including the clear region in the polymer sheet in which the colored region is formed.

As used herein, "plasticizer content" can be measured as parts per hundred resin (phr) parts, on a weight per weight basis. For example, if 30 grams of plasticizer is added to 100 grams of polymer resin, then the plasticizer content of the resulting plasticized polymer would be 30 phr. As used herein throughout, when the plasticizer content of a polymer sheet is given, the plasticizer content of that particular sheet is determined with reference to the phr of the plasticizer in the melt that was used to produce that particular sheet.

For sheets of unknown plasticizer content, the plasticizer content can be determined via a wet chemical method in which an appropriate solvent, or a mixture of solvents, is used to extract the plasticizer out of the sheet. By knowing the weight of the sample sheet and the weight of the extracted sheet, the plasticizer content in phr can be calculated. In the case of a two polymer sheet interlayer, one polymer sheet can be physically separated from another before the plasticizer content in each of the polymer sheets is measured.

In various embodiments of the present invention, the plasticizer content of the two polymer sheets differ by at least 8 phr, 10 phr, 12 phr, 15 phr, 18 phr, 20 phr, or 25 phr. Each sheet can have, for example 30 to 100 phr, 40 to 90 phr, or 50 to 80 phr.

In various embodiments of the present invention, the residual hydroxyl contents of the thermoplastic polymer components of the polymer sheets are different, which allows for the fabrication of sheets with stable plasticizer differences. As used herein, residual hydroxyl content (as vinyl hydroxyl content or poly(vinyl alcohol) (PVOH) content) refers to the amount of hydroxyl groups remaining as side groups on the polymer chains after processing is complete. For example, poly(vinyl butyral) can be manufactured by hydrolyzing poly(vinyl acetate) to poly(vinyl alcohol), and then reacting the poly(vinyl alcohol) with butyraldehyde to form poly(vinyl butyral). In the process of hydrolyzing the poly(vinyl acetate), typically not all of the acetate side groups are converted to hydroxyl groups. Further, reaction with butyraldehyde typically will not result in all hydroxyl groups being converted to acetal groups. Consequently, in any finished poly(vinyl butyral), there will typically be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments of the present invention, the residual hydroxyl content of the two adjacent polymer sheets can differ by at least 1.8%, 2.0%, 2.2%, 2.5%, 3.0%, 4.0%, 5.0%, 7.5%, or by at least 10%. This difference is calculated by subtracting the residual hydroxyl content of the sheet with the lower residual hydroxyl content from the residual hydroxyl content of the sheet with the greater residual hydroxyl content. For example, if a first polymer sheet has a residual hydroxyl content of 20 weight percent, and a second polymer sheet has a residual hydroxyl content of 17 weight percent, then the residual hydroxyl content of the two sheets differs by 3 weight percent.

For a given type of plasticizer, the compatibility of that plasticizer in a poly(vinyl butyral) is largely determined by the hydroxyl content. Typically, poly(vinyl butyral) with a greater residual hydroxyl content will result in a reduced plasticizer compatibility or capacity. Likewise, poly(vinyl butyral) with a lower residual hydroxyl content will result in an increased plasticizer compatibility or capacity. These properties can be used to select the hydroxyl content of each poly(vinyl butyral) polymer and formulate each of the polymer sheets to allow for the proper plasticizer loading and to stably maintain the difference in plasticizer content between the polymer sheets.

As is known in the art, residual hydroxyl content can be controlled by controlling reaction times, reactant concentrations, and other variables in the manufacturing process. In various embodiments, the residual hydroxyl content of the two sheets is as follows: first sheet less than 25% and second sheet less than 23%; first sheet less than 23% and second sheet less than 21%; first sheet less than 21% and second sheet less than 19%; first sheet less than 20% and second sheet less than 17%; first sheet less than 18% and second sheet less than 15%; first sheet less than 15% and second sheet less than 12%. In any of these embodiments, any of the values given in the previous paragraph for the difference in hydroxyl content between the two layers can be used.

As used herein, tensile break stress, or tensile strength, of a polymer sheet is defined and measured according to the method described in JIS K6771. In various embodiments of the present invention, the two polymer sheets have a tensile break stress according to the following, wherein the first polymer sheet in the following list is the polymer sheet with the lower plasticizer content: first polymer sheet greater than 135 kilograms per square centimeter and second polymer sheet less than 120 kilograms per square centimeter; first polymer sheet greater than 150 kilograms per square centimeter and second polymer sheet less than 135 kilograms per square centimeter; first polymer sheet greater than 165 kilograms per square centimeter and second polymer sheet less than 150 kilograms per square centimeter; or first polymer sheet greater than 180 kilograms per square centimeter and second polymer sheet less than 165 kilograms per square centimeter; or in general the two polymer sheets differ in tensile break stress by at least 15 kilograms per square centimeter.

For the purposes of the present invention, the difference in sound transmission loss between a first polymer sheet formed from composition (A) and a second polymer sheet formed from composition (B) in a multiple layer interlayer is determined according to the following:

First, form a first polymer sheet (Sheet A) having a thickness of 0.7620 millimeters (30 mils) and composed of (A) and a second polymer sheet (Sheet B) having a thickness of 0.7620 millimeters (30 mils) and composed of (B).

Determine which sheet—Sheet A or Sheet B—has the higher tensile modulus (see procedure elsewhere herein).

Laminate a 47 centimeter×74 centimeter rectangle of Sheet A between two layers of 2.1 millimeter thick float glass to form Panel A.

Laminate 47 centimeter×74 centimeter rectangle of Sheet B between two layers of 2.1 millimeter thick float glass to form Panel B.

Determine the coincident frequency of the Panel having the Sheet with the higher tensile modulus (see elsewhere herein for procedure), which are designated the "reference panel" and the "reference interlayer."

Measure the Sound Transmission Loss (STL) of Panel A and Panel B at the coincident frequency determined in the last step with ASTM E90 (95) at a fixed temperature of 20° C.

The difference in sound transmission loss between two sheets in a multiple layer interlayer is then computed to be:

|(STL Panel A)−(STL Panel B)|

For purposes of the present invention a "coincident frequency" means the frequency at which a panel exhibits a dip in sound transmission loss due to "coincident effect", which can be experimentally determined from the plot of sound transmission loss versus ⅓ octave band frequency. In the various embodiments of the present invention, the coincident frequency of a panel is typically in the range of 2,000 to 6,000 Hertz, and can also be estimated from a monolithic sheet of glass having a thickness equal to the combined glass thickness of glass in the reference panel from the algorithm $$f_c = \frac{15,000}{d}$$

where "d" is the total glass thickness in millimeters and "$f_c$" is in Hertz.

As used herein, the coincident frequency of the reference panel is also referred to as the "reference frequency".

In typical laminates with two outer layers of glass, the "combined glass thickness" is the sum of the thickness of the two layers of glass. In more complex laminates with three or more layers of glass, the combined glass thickness would be the sum of the three or more layers of glass.

In various embodiments of the present invention, multiple layer interlayers of the present invention comprise at least two polymer sheets exhibiting a difference in sound transmission loss, the determination of which is described elsewhere herein, of at least 2 decibels, more preferably 4 decibels, and even more preferably 6 decibels or higher or 8 decibels or higher.

In various embodiments of the present invention, two adjacent polymer sheets of the present invention have the differing plasticizer content as described above, and each further has a residual acetate content of less than 5 mole %, less than 4 mole %, less than 3 mole %, less than 2 mole %, or less than 1 mole %. These residual acetate concentrations can be combined with the residual hydroxyl contents given above, in any combination, to form two polymer sheets of the present invention having the described differences in plasticizer content and residual hydroxyl content while having little to no residual acetate content. Further embodiments of multiple layer interlayers of the present invention include interlayers having more than two polymer sheets, wherein one or more of the additional polymer sheets has a residual acetate content of less than 5 mole %, less than 4 mole %, less than 3 mole %, less than 2 mole %, or less than 1 mole %.

Further embodiments of the present invention include any of the foregoing embodiments further comprising a third polymer sheet. Addition of this third polymer sheet layer results in a three layer construct that has the following structure for interlayers with a plasticizer differential between adjacent polymer sheets: First polymer sheet with relatively low plasticizer content//Second polymer sheet with relatively high plasticizer content//Third polymer sheet. This third polymer sheet can have the same composition as the first polymer sheet, or it can be different.

In various embodiments, the third polymer sheet has the same composition as the first polymer sheet, which provides a three layer laminated interlayer that has a relatively difficult to handle polymer sheet laminated between two relatively easy to handle sheets, resulting in a multiple layer interlayer that is relatively easy to handle and which can be incorporated directly into existing processes that previously used a single polymer sheet having the composition of the outer two polymer sheets of the interlayer of the present invention, or a composition that results in similar processing characteristics (for example, blocking tendency).

In other embodiments utilizing three polymer sheets in a single interlayer, the third polymer sheet has a different composition than the first polymer sheet, and the differences in composition between the third polymer sheet and the second polymer sheet can be any of the differences given above for the differences between the first polymer sheet and the second polymer sheet.

For example, one exemplary embodiment would be: first polymer sheet with a residual hydroxyl content of 20%//second polymer sheet with a residual hydroxyl content of 16%//third polymer sheet with a residual hydroxyl content of 18%. It will be noted that, in this example, the third polymer sheet differs from the second polymer sheet at least in that it has a residual hydroxyl content that is 2% greater than the hydroxyl content of the second polymer sheet. Of course, any of the other differences noted herein throughout can singly or in combination distinguish the third polymer layer from the second polymer layer.

In three layer embodiments described herein, at least one of the polymer sheets has a colored region in a gradient region.

In addition to the three layer embodiments described herein, further embodiments include interlayers having more than three layers in which further low residual hydroxyl sheets can be used, for example, iterations of polymer sheets having alternating plasticizer contents with alternating hydroxyl content and optionally low or negligible residual acetate content. Interlayers formed in such a manner can have, for example, 4, 5, 6, or up to 10 individual layers.

Other conventional layers, as are known in the art, can be incorporated into the interlayers of the present invention. For example, polymer films (described in detail elsewhere herein) such as polyesters like poly(ethylene terephthalate) having a metallized layer, an infrared reflecting stack, or other performance layer deposited thereon, can be included between any two layers of polymer sheets of the present invention. For example, in a two layer embodiment, an interlayer can be fabricated with the following layout: polymer sheet with relatively high plasticizer content//polyester film having a performance layer//polymer sheet with relatively low plasticizer content. In general, additional layers of thermoplastics, such as poly(vinyl butyral), polyester films, primer layers, and hardcoat layers can be added to the multiple layer interlayers of the present invention according to the desired result and the particular application.

For each interlayer embodiment of the present invention in which two or more separate polymer sheets are disposed in contact with one another and subsequently laminated into a single interlayer, there also exists an embodiment where a coextruded interlayer is formed to have the same layer arrangement, which, for the purposes of the present invention, is considered to be formed of multiple polymer sheets and is considered a "multiple layer" interlayer.

In addition to the interlayers provided herein, the present invention also provides methods of reducing the level of sound through an opening, comprising the step of disposing in the opening a multiple layer glass panel comprising any of the interlayers of the present invention.

The present invention also includes methods of manufacturing an interlayer, comprising the steps of forming a first polymer sheet and a second polymer sheet, wherein the two polymer sheets have different compositions, as described elsewhere herein, and laminating the two polymer sheets together to form the interlayer.

The present invention also includes methods of manufacturing an interlayer, comprising the steps of forming a first polymer sheet, a second polymer sheet, and a third polymer sheet, wherein the three polymer sheets have compositions according to the three layer embodiments as described elsewhere herein, and laminating the three polymer sheets together to form the interlayer.

The present invention also includes methods of manufacturing a multiple layer glazing, comprising laminating any of the interlayers of the present invention between two rigid, transparent panels, as are known in the art, such as glass or acrylic layers.

The present invention also includes multiple layer glass panels, such as windshields and architectural windows, comprising a multiple layer interlayer of the present invention.

Also included are multiple layer glazing panels having plastics, such as acrylics, or other suitable materials in place of the glass panels.

In various embodiments of the present invention, an interlayer comprises a colored region within the gradient region of one or more layers of the interlayer.

Polymer Film

As used herein, a "polymer film" means a relatively thin and rigid polymer layer that functions as a performance enhancing layer. Polymer films differ from polymer sheets, as used herein, in that polymer films do not themselves provide the necessary penetration resistance and glass retention properties to a multiple layer glazing structure, but rather provide performance improvements, such as infrared absorption character. Poly(ethylene terephthalate) is most commonly used as a polymer film.

In various embodiments, the polymer film layer has a thickness of 0.013 mm to 0.20 mm, preferably 0.025 mm to 0.1 mm, or 0.04 to 0.06 mm. The polymer film layer can optionally be surface treated or coated to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known, (see, for example, U.S. Pat. Nos. 4,017,661 and 4,786,783), the metal layer(s) may optionally be electrically resistance heated for defrosting or defogging of any associated glass layers.

An additional type of polymer film that can be used with the present invention, which is described in U.S. Pat. No. 6,797,396, comprises a multitude of nonmetallic layers that function to reflect infrared radiation without creating interference that can be caused by metallic layers.

The polymer film layer, in some embodiments, is optically transparent (i.e. objects adjacent one side of the layer can be comfortably seen by the eye of a particular observer looking through the layer from the other side), and usually has a greater, in some embodiments significantly greater, tensile modulus regardless of composition than that of any adjacent polymer sheet. In various embodiments, the polymer film layer comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film layer comprises materials such as re-stretched thermoplastic films having the noted properties, which include polyesters, for example poly(ethylene terephthalate) and poly(ethylene terephthalate) glycol (PETG). In various embodiments, poly(ethylene terephthalate) is used, and, in various embodiments, the poly(ethylene terephthalate) has been biaxially stretched to improve strength, and has been heat stabilized to provide low shrinkage characteristics when subjected to elevated temperatures (e.g. less than 2% shrinkage in both directions after 30 minutes at 150° C.).

Various coating and surface treatment techniques for poly(ethylene terephthalate) film that can be used with the present invention are disclosed in published European Application No. 0157030. Polymer films of the present invention can also include a hardcoat and/or and antifog layer, as are known in the art.

Polymer Sheet

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

The polymer sheet can comprise any suitable polymer, and, in a preferred embodiment, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In other embodiments, the polymer sheet comprises plasticized poly(vinyl butyral). In further embodiments the polymer sheet comprises poly(vinyl butyral) and one or more other polymers. Other polymers having a proper plasticizing capacity can also be used. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by known acetalization processes that involve reacting poly(vinyl alcohol) with butyraldehyde in the presence of an acid catalyst, followed by neutralization of the catalyst, separation, stabilization, and drying of the resin, with the understanding that in various embodiments, residual hydroxyl content will be controlled, as described elsewhere herein.

In various embodiments, the polymer sheet comprises poly(vinyl butyral) having a molecular weight greater than 30,000, 40,000, 50,000, 55,000, 60,000, 65,000, 70,000, 120,000, 250,000, or 350,000 grams per mole (g/mole or Daltons). Small quantities of a dialdehyde or trialdehyde can also be added during the acetalization step to increase molecular weight to greater than 350 Daltons (see, for example, U.S. Pat. Nos. 4,874,814; 4,814,529; and 4,654,179). As used herein, the term "molecular weight" means the weight average molecular weight.

If additional, conventional polymer sheets are used in addition to any of the embodiments described above as having plasticizer content differences, those additional, conventional polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779, and $C_6$ to $C_8$ adipate esters, such as hexyl adipate. In preferred embodiments, the plasticizer is triethylene glycol di-(2-ethylhexanoate).

Adhesion control agents (ACAs) can also be included in the polymer sheets of the present invention to impart the desired adhesiveness. These agents can be incorporated into the outer sheets in a three polymer sheet embodiment, for example. Any of the ACAs disclosed in U.S. Pat. No. 5,728,472 can be used. Additionally, residual sodium acetate and/or potassium acetate can be adjusted by varying the amount of the associated hydroxide used in acid neutralization. In various embodiments, polymer sheets of the present invention comprise, in addition to sodium acetate, magnesium bis(2-ethyl butyrate)(chemical abstracts number 79992-76-0). The magnesium salt can be included in an amount effective to control adhesion of the polymer sheet to glass.

Additives may be incorporated into the polymer sheet to enhance its performance in a final product. Such additives include, but are not limited to, plasticizers, dyes, pigments, stabilizers (e.g., ultraviolet stabilizers), antioxidants, flame retardants, other IR absorbers, anti-block agents, combinations of the foregoing additives, and the like, as are known in the art.

Agents that selectively absorb light in the visible or near infrared spectrum can be added to any of the appropriate polymer sheets. Agents that can be used include dyes and pigments such as indium tin oxide, antimony tin oxide, or lanthanum hexaboride ($LaB_6$).

Any suitable method can be used to produce the polymer sheets and the multiple layer interlayers of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a mixture of resin with a plasticizer and, optionally, other additives.

One exemplary method of forming a poly(vinyl butyral) layer comprises extruding molten poly(vinyl butyral) comprising resin, plasticizer, and additives and then forcing the melt through a sheet die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a sheet. In either embodiment, the surface texture at either or both sides of the layer may be controlled by adjusting the surfaces of the die opening or by providing texture at the roller surface. Other techniques for controlling the layer texture include varying parameters of the materials (for example, the water content of the resin and/or the plasticizer, the melt temperature, molecular weight distribution of the poly(vinyl butyral), or combinations of the foregoing parameters). Furthermore, the layer can be configured to include spaced projections that define a temporary surface irregularity to facilitate the de-airing of the layer during lamination processes after which the elevated temperatures and pressures of the laminating process cause the projections to melt into the layer, thereby resulting in a smooth finish.

Fabrication of a multiple layer interlayer can be accomplished by using known techniques in the art, such as independently producing three layers of polymer sheet, and then laminating the three sheets together under appropriate conditions, such as pressure and heat, to yield a single, multiple layer interlayer.

In various embodiments, the interlayers of the present invention can have total thicknesses of 0.1 to 2.5 millimeters, 0.2 to 2.0 millimeters, 0.25 to 1.75 millimeters, and 0.3 to 1.5 millimeters (mm). The individual polymer sheets of a multiple layer interlayer can have, for example, approximately equal thicknesses that, when added together, result in the total thickness ranges given above. Of course, in other embodiments, the thicknesses of the layers can be different, and can still add to the total thicknesses given above.

The parameters for the polymer sheet described above apply as well to any layer in a multiple layer construct of the present invention that is a poly(vinyl butyral) type layer.

The following paragraphs describe various techniques that can be used to improve and/or measure the characteristics of the polymer sheet.

The clarity of a polymer sheet, and particularly a poly(vinyl butyral) layer, can be determined by measuring the haze value, which is a quantification of the amount of light scattered away from the direction of the incident beam in passing through the layer. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

The visible transmittance can be quantified using a UV-Vis-NIR spectrophotometer such as the Lambda 900 made by Perkin Elmer Corp. by methods described in international standard ISO 9050:1990. In various embodiments, the transmittance through a polymer sheet of the present invention is at least 60%, at least 70%, or at least 80%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −18° C. (0° F.) and manually pummeled with a hammer to break the glass. All broken glass that is not adhered to the poly(vinyl butyral) layer is then removed, and the amount of glass left adhered to the poly(vinyl butyral) layer is visually compared with a set of standards. The standards correspond to a scale in which varying degrees of glass remain adhered to the poly(vinyl butyral) layer. In particular, at a pummel standard of zero, no glass is left adhered to the poly(vinyl butyral) layer. At a pummel standard of 10, 100% of the glass remains adhered to the poly(vinyl butyral) layer. Poly(vinyl butyral) layers of the present invention can have, for example, a pummel value of between 3 and 10.

Tensile break stress can be determined for a polymer sheet according to the procedure described in JIS K6771.

As used herein, "titer" can be determined for sodium acetate and potassium acetate (as used herein, the "total alkaline titer") and magnesium salts in a sheet sample using the following method.

In order to determine the amount of resin in each sheet sample that is weighed, the following equation is used, where PHR is defined as the pounds per hundred pounds of resin including plasticizer and any other additives to the resin in the original sheet sample preparation.

$$\text{Grams of resin in sheet sample} = \frac{\text{Grams sheet sample}}{(100 + PHR)/100}$$

Approximately 5 g of resin in the sheet sample is the target mass used to estimate the amount of sheet sample to start with, with the calculated mass of resin in the sheet sample used for each titer determination. All titrations should be completed in the same day.

The sheet sample is dissolved into 250 milliliters of methanol in a beaker. It may take up to 8 hours for the sheet sample to be completely dissolved. A blank with just methanol is also prepared in a beaker. The sample and blank are each titrated with 0.00500 normal HCl using an automated pH titrator programmed to stop at a pH of 2.5. The amount of HCl added to each the sample and the blank to obtain a pH of 4.2 is recorded. The HCl titer is determined according to the following:

$$\text{HCl Titer [mls 0.01N HCl/100 g resin]} = \frac{50 \times (\text{mls of HCl sample} - \text{mls of HCl blank})}{\text{Calculated grams of resin}}$$

To determine magnesium salt titer, the following procedure is used:

12 to 15 mls of pH 10.00 Buffer solution, prepared from 54 grams of ammonium chloride and 350 mls of ammonium hydroxide diluted to one liter with methanol, and 12 to 15 mls of Erichrome Black T indicator are added to the blank and each sheet sample, all of which have already been titrated with HCl, as described above. The titrant is then changed to a 0.000298 g/ml EDTA solution prepared from 0.3263 g tetrasodium ethylenediaminetetraacetate dihydrate, 5 ml water, diluted to one liter with methanol. The EDTA titration is measured by light transmittance at 596 nm. The % transmittance is first adjusted to 100% in the sample or blank before the titration is started while the solution is a bright magenta-pink color. When transmittance at 596 nm becomes constant, the EDTA titration is complete, and the solution will be a deep indigo color. The volume of EDTA titrated to achieve the indigo blue end point is recorded for the blank and each sheet sample. Magnesium salt titer is determined according to the following:

Magnesium Salt

Titer [as $1 \times 10^{-7}$ mole of magnesium salt per gram resin] =

$$\frac{0.000298 \text{ g/ml } EDTA \times (\text{mls of } EDTA \text{ for sample} - \text{mls of } EDTA \text{ for blank})}{(\text{grams of resin in sheet sample}) \times 380.2 \text{ g/mole } EDTA \times 0.0000001}$$

From this result, total alkaline titer, as $1 \times 10^{-7}$ mole of acetate salt per gram resin, can be calculated according to the following:

Total Alkaline Titer=HCl Titer of sheet−(2×Total Magnesium Salt Titer)

The portion of the total alkalinity titer attributable to either sodium acetate or potassium acetate can be determined by first determining the total alkaline titer, as described above. After determining total alkaline titer, destructive analysis on the polymer sheet can be performed by Inductively Coupled Plasma Emission Spectroscopy (ICP) resulting in a ppm concentration for potassium and a ppm concentration for sodium.

The alkaline titer attributable to sodium acetate is defined herein as the total alkaline titer multiplied by the ratio [ppm sodium/(ppm sodium+ppm potassium)].

The alkaline titer attributable to potassium acetate is defined herein as the total alkaline titer multiplied by the ratio [ppm potassium/(ppm sodium+ppm potassium)].

EXAMPLES

Poly(vinyl butyral) sheets having noted residual hydroxyl content formulated with various amount of 3GEH (triethylene glycol di-(2-ethylhexanoate)), and their sheet thicknesses are listed in Table 1. These sheets are either used to construct the interlayers of the present invention or used as the reference interlayer for making reference panels. In all sheets, the residual acetate contents are negligible and are less than 1 mole %.

TABLE 1

| PVB Sheet No. | Poly(vinyl butyral) sheet | Residual hydroxyl content (%) | 3GEH content (phr) | Sheet thickness (mil) | Colored region | Gradient to clear ratio | Tensile break stress, kg/cm² |
|---|---|---|---|---|---|---|---|
| 1 | PVB-1 | 18.5 | 38 | 30 | Blue | 0.20 | 230 |
| 2 | PVB-2 | 18.5 | 38 | 30 | Green | 0.25 | 230 |
| 3 | PVB-3 | 18.5 | 38 | 13 | Blue | 0.40 | 230 |
| 4 | PVB-4 | 15.9 | 52 | 40 | Blue | 0.24 | 140 |
| 5 | PVB-5 | 16.0 | 49 | 45 | Blue | 0.26 | 160 |
| 6 | PVB-6 | 18.5 | 38 | 30 | No | 0 | 230 |
| 7 | PVB-7 | 15.9 | 52 | 30 | No | 0 | 140 |
| 8 | PVB-8 | 11.2 | 75 | 6 | No | 0 | <110 |
| 9 | PVB-9 | 10.7 | 75 | 6 | No | 0 | <110 |

Conventional interlayers and examples of the interlayers of the present invention are shown in the Table 2, where a single asterisk indicates that the interlayers are stored at either cold temperature, typically 10° C., or at room temperature, typically 20 to 23° C. and a double asterisk indicates that the sheet is a reference sheet.

TABLE 2

| Interlayer No. | Interlayer construction with multiple sheets | | | Difference in OH content between sheets 1 and 2 (%) | 3GEH content as formulated in multiple sheet | | | Measured 3GEH content in each sheet after 4 weeks (phr)* | | | Measured difference in 3GEH content between sheets 1 and 2 (phr)* |
|---|---|---|---|---|---|---|---|---|---|---|---|
| | Sheet 1** | Sheet 2 | Sheet 3*** | | Sheet 1 | Sheet 2 | Sheet 3 | Sheet 1 | Sheet 2 | Sheet 3 | |
| 1 (conventional) | PVB 1 | — | — | — | 38 | — | — | 38 | — | — | — |
| 2 (conventional) | PVB 2 | — | — | — | 38 | — | — | 38 | — | — | — |
| 3 (conventional) | PVB 1 | — | PVB 6 | 0 | 38 | — | 38 | 38 | — | 38 | 0 |

TABLE 2-continued

| Interlayer No. | Interlayer construction with multiple sheets Sheet 1** | Sheet 2 | Sheet 3*** | Difference in OH content between sheets 1 and 2 (%) | 3GEH content as formulated in multiple sheet Sheet 1 | Sheet 2 | Sheet 3 | Measured 3GEH content in each sheet after 4 weeks (phr)* Sheet 1 | Sheet 2 | Sheet 3 | Measured difference in 3GEH content between sheets 1 and 2 (phr)* |
|---|---|---|---|---|---|---|---|---|---|---|---|
| 4 (conventional) | PVB 1 | — | PVB 2 | 0 | 38 | — | 38 | 38 | — | 38 | 0 |
| 5 (conventional) | PVB 1 | PVB 6 | PVB 1 | 0 | 38 | 38 | 38 | 38 | 38 | 38 | 0 |
| 6 | PVB 1 | PVB 7 | — | 2.6 | 38 | 52 | — | 37.8 | 52.2 | 37.8 | 14.4 |
| 7 | PVB 3 | PVB 8 | PVB 3 | 7.3 | 38 | 75 | 38 | 37.9 | 75.7 | 37.9 | 37.8 |
| 7 | PVB 3 | PVB 9 | PVB 3 | 7.8 | 36 | 75 | 36 | 35.9 | 75.4 | 35.9 | 39.5 |
| 8 | PVB 6 | PVB 4 | — | 2.6 | 38 | 52 | — | 37.8 | 52.2 | — | 14.4 |
| 9 | PVB 6 | PVB 5 | — | 2.5 | 38 | 49 | 38 | 38 | 52 | 38 | 14 |
| 9 | PVB 3 | PVB 11 | PVB 3 | 6.7 | 35 | 72.9 | 35 | 35.0 | 73.0 | 35.0 | 36.0 |

Conventional laminated glass (reference panels), and examples of laminated glass consisting of interlayers with improvements in acoustical performance relative to the reference panels are shown in Table 3. Sheet 1 and Sheet 3 are the reference sheets. STL of these sheets listed in Table 3 are obtained when they are used as reference interlayers in accordance with typical laminated glass construction. In Table 3, a single asterisk designates glass laminates containing two panes of symmetric glass sheet (each of the glass sheets has equal thickness), and "STL" refers to Sound Transmission Loss.

TABLE 3

| Laminate No. | Intelayer contruction Sheet 1 | Sheet 2 | Sheet 3 | Combined glass thickness (mm)* | STL at reference frequency (dB) sheet 1 | sheet 2 | sheet 3 | STL difference between sheet 1 and sheet 2 at reference frequency (dB) |
|---|---|---|---|---|---|---|---|---|
| 1 | PVB 1 | — | — | 4.2 | 31 | — | — | 0 |
| 2 | PVB 2 | — | — | 4.2 | 31 | — | — | 0 |
| 3 | PVB 1 | — | PVB 6 | 4.2 | 31 | — | 31 | 0 |
| 4 | PVB 1 | — | PVB 2 | 4.2 | 32 | — | 32 | 0 |
| 5 | PVB 1 | PVB 6 | PVB 1 | 4.2 | 32 | 32 | 32 | 0 |
| 6 | PVB 1 | PVB 7 | — | 4.2 | 31 | 38 | — | 7 |
| 7 | PVB 3 | PVB 8 | PVB 3 | 4.2 | 32 | 40 | 32 | 8 |
| 8 | PVB 3 | PVB 9 | PVB 3 | 4.2 | 32 | 40 | 32 | 8 |
| 9 | PVB 6 | PVB 4 | — | 4.2 | 31 | 38 | — | 7 |
| 10 | PVB 6 | PVB 5 | — | 4.2 | 31 | 37 | — | 6 |

Effects of salt concentrations on the adhesion of the gradient region of interlayers of the present invention are shown in the Table 4, where a single asterisk designates that laminates contain two panes of symmetric glass sheet (2.1 mm) (each of the glass sheets has equal thickness).

TABLE 4

| Laminate No.* | Total alkaline titer in interlayer Clear region | Gradient region | Difference in total alkaline titer between clear and gradient regions | Pummel adhesion Clear region | Gradient region | Adhesion delta (clear – gradient) |
|---|---|---|---|---|---|---|
| 1 | 23 | 23 | 0 | 4.7 | 2.5 | 2.2 |
| 2 | 24 | 20 | 4 | 3.8 | 2.8 | 1 |
| 3 | 25 | 15 | 10 | 4.0 | 4.1 | −0.1 |
| 4 | 25 | 8 | 17 | 4.0 | 5.1 | −1.1 |

Effects of the incorporation of epoxy resin in the colored region on the adhesion of the gradient region of interlayers of the present invention are shown in the Table 5, where a single asterisk indicates that laminates contain two panes of symmetric glass sheet (2.1 mm), i.e., each of the glass sheets has equal thickness, a double asterisk indicates that magnesium salt titer is the same in all examples, and a triple asterisk indicates epoxy—1: DER 732 and Epoxy—2: Heloxy 116.

TABLE 5

| Laminate No.* | Total alkaline titer in both clear and gradient** | Phr of Epoxy-1 in Interlayer*** | | Phr of Epoxy-2 interlayer*** | | Pummel adhesion | | Adhesion delta (clear − gradient) |
|---|---|---|---|---|---|---|---|---|
| | | clear region | gradient region | clear region | gradient region | clear region | gradient region | |
| 1 | 12 | — | — | 0 | 0 | 6.6 | 3.6 | 3 |
| 2 | 12 | — | — | 0 | 2 | 6.8 | 6.5 | 0.3 |
| 3 | 20 | 0 | 0 | — | — | 5 | 3 | 2 |
| 4 | 20 | 0 | 2 | — | — | 4.7 | 4.7 | 0 |
| 5 | 17 | 0 | 0 | — | — | 4.5 | 3 | 1.5 |
| 6 | 17 | 0 | 2 | — | — | 5 | 5 | 0 |

By virtue of the present invention, it is now possible to provide multiple layer interlayers that have gradient regions having colored regions and that reduce sound transmission and that are easily handled and readily incorporated into multiple layer constructs, such as laminated glass panels for windshields and architectural windows.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising residual acetate content in any of the ranges given in addition to any of the ranges given for plasticizer, where appropriate, to form many permutations that are within the scope of the present invention but that would be cumbersome to list.

Any FIGURE reference numbers given within the abstract or any claims are for illustrative purposes only and should not be construed to limit the claimed invention to any one particular embodiment shown in any FIGURE.

Figures are not drawn to scale unless otherwise indicated.

Each reference, including journal articles, patents, applications, and books, referred to herein is hereby incorporated by reference in its entirety.

We claim:

1. A poly(vinyl butyral) interlayer comprising:
a single poly(vinyl butyral) sheet, including:
a first plasticized poly(vinyl butyral) layer having a first gradient region and a first clear region;
a second plasticized poly(vinyl butyral) layer having a second gradient region and a second clear region;
a third plasticized poly(vinyl butyral) layer having a third gradient region and a third clear region;
wherein the amount of plasticizer in said second layer is at least 10 parts per hundred greater than the amount of plasticizer in said first layer, and wherein said first layer and said second layer each have a residual acetate content of less than 5 mol percent;
wherein the amount of plasticizer in said second layer is at least 10 parts per hundred greater than the amount of plasticizer in said third layer, and wherein said third layer and said second layer each have a residual acetate content of less than 5 mol percent;
wherein at least one of said first gradient region, said second gradient region and said third gradient region has a colored region; and,
wherein said colored region has a total alkaline titer that is at least 4 titers less than the total alkaline titer of the clear region of the layer in which it is formed.

2. The interlayer of claim 1, wherein said colored region has a total alkaline titer that is at least 8 titers less than the total alkaline titer of the clear region of the layer in which it is formed.

3. The interlayer of claim 1, wherein said colored region incorporates an epoxy compound.

4. The interlayer of claim 3, wherein said colored region epoxy compound is an epoxy resin.

5. The interlayer of claim 4, wherein said epoxy resin is selected from the group consisting of an epoxide or diepoxide of poly(oxypropylene) glycol.

6. The interlayer of claim 1, wherein said first gradient region, said second gradient region and said third gradient region have a ratio of the height of said gradient region, in the layer in which it is formed, to the height of the clear region below it of greater than 0.25.

7. The interlayer of claim 6, wherein said first gradient region, said second gradient region and said third gradient region have said ratio of the height of said gradient region, in the layer in which it is formed, to the height of the clear region below it of greater than 0.4.

8. The interlayer of claim 1, wherein the amount of plasticizer in said second layer is at least 15 parts per hundred greater than the amount of plasticizer in said first layer, and wherein the amount of plasticizer in said second layer is at least 15 parts per hundred greater than the amount of plasticizer in said third layer.

9. The interlayer of claim 1, wherein said second layer has a residual hydroxyl content per weight percentage that is at least 2% lower than the residual hydroxyl content per weight percentage of said first layer.

10. The interlayer of claim 1, wherein said second layer has a residual hydroxyl content per weight percentage that is at least 4% lower than the residual hydroxyl content per weight percentage of said first polymer layer.

11. The interlayer of claim 1, wherein said second layer has a residual hydroxyl content per weight percentage that is at least 8% lower than the residual hydroxyl content per weight percentage of said first polymer layer.

12. The interlayer of claim 1, wherein said second layer has a residual hydroxyl content per weight percentage of less than 17.0% and said first polymer layer has a residual hydroxyl content per weight percentage of less than 20%.

13. The interlayer of claim 1, wherein said first layer and said second layer each have a residual acetate content of less than 3 mol percent.

14. The interlayer of claim 1, wherein said first layer and said second layer each have a residual acetate content of less than 1 mol percent.

15. The interlayer of claim 1, wherein said colored region is said entire gradient region.

16. The interlayer of claim 1, wherein said colored region is a subportion of said gradient region.

17. The polymer interlayer of claim 1, wherein said first gradient region has a colored region.

18. The interlayer of claim 1, wherein said second gradient region has a colored region.

19. The interlayer of claim 1, wherein said first gradient region and said second gradient region each have a colored region.

20. The interlayer of claim 1, wherein said third gradient region has a colored region.

21. The interlayer of claim 1, wherein said third gradient region and said second gradient region each have a colored region.

22. The interlayer of claim 1, wherein said first, second and third gradient region each have a colored region.

23. A multiple layer glazing panel comprising a poly(vinyl butyral) interlayer comprising:
   a single poly(vinyl butyral) sheet, including:
      a first plasticized poly(vinyl butyral) layer having a first gradient region and a first clear region;
      a second plasticized poly(vinyl butyral) layer having a second gradient region and a second clear region;
      a third plasticized poly(vinyl butyral) layer having a third gradient region and a third clear region;
   wherein the amount of plasticizer in said second layer is at least 10 parts per hundred greater than the amount of plasticizer in said first layer, and wherein said first layer and said second layer each have a residual acetate content of less than 5 mol percent;
   wherein the amount of plasticizer in said second layer is at least 10 parts per hundred greater than the amount of plasticizer in said third layer, and wherein said third layer and said second layer each have a residual acetate content of less than 5 mol percent;
   wherein at least one of said first gradient region, said second gradient region and said third gradient region comprises has a colored region; and,
   wherein said colored region has a total alkaline titer that is at least 4 titers less than the total alkaline titer of the clear region of the layer in which it is formed.

24. A method of making a multiple layer interlayer, comprising:
   coextruding a first plasticized poly(vinyl butyral) melt to form a first layer having a first gradient region and a first clear region; and a second plasticized polyvinyl butyral) melt to form a second layer having a second gradient region and a second clear region; and a third plasticized poly(vinyl butyral) melt to form a third layer having a third gradient layer and a third clear region; wherein said second layer is between said first layer and said third layer;
   wherein the amount of plasticizer in said second layer is at least 10 parts per hundred greater than the amount of plasticizer in said first layer, and wherein said first layer and said second layer each have a residual acetate content of less than 5 mol percent:
   wherein the amount of plasticizer in said second layer is at least 10 parts per hundred greater than the amount of plasticizer in said third layer, and wherein said third layer and said second layer each have a residual acetate content of less than 5 mol percent;
   wherein at least one of said first gradient region, said second gradient region and said third gradient region has a colored region; and,
   wherein said colored region has a total alkaline titer that is at least 4 titers less than the total alkaline titer of the clear region of the layer in which it is formed.

* * * * *